US009646088B1

(12) United States Patent
Beedgen et al.

(10) Patent No.: US 9,646,088 B1
(45) Date of Patent: May 9, 2017

(54) DATA COLLECTION AND TRANSMISSION

(71) Applicant: Sumo Logic, Redwood City, CA (US)

(72) Inventors: Christian Friedrich Beedgen, Mountain View, CA (US); Kumar Saurabh, Sunnyvale, CA (US); Bruno Kurtic, San Mateo, CA (US)

(73) Assignee: Sumo Logic, Redwood City, CA (US)

( * ) Notice: Subject to any disclaimer, the term of this patent is extended or adjusted under 35 U.S.C. 154(b) by 0 days.

(21) Appl. No.: 14/615,390

(22) Filed: Feb. 5, 2015

Related U.S. Application Data

(63) Continuation of application No. 13/173,882, filed on Jun. 30, 2011, now Pat. No. 8,983,912.

(51) Int. Cl.
*G06F 17/30* (2006.01)
*H04L 12/26* (2006.01)
*H04L 29/08* (2006.01)

(52) U.S. Cl.
CPC ........ *G06F 17/30861* (2013.01); *H04L 43/04* (2013.01); *H04L 67/10* (2013.01)

(58) Field of Classification Search
CPC ................................................ G06F 17/30861

USPC .................................................. 707/661, 771
See application file for complete search history.

(56) References Cited

U.S. PATENT DOCUMENTS

2008/0162592 A1\* 7/2008 Huang et al. ................. 707/202
2012/0197914 A1\* 8/2012 Harnett ............. G06F 17/30637
707/755

\* cited by examiner

*Primary Examiner* — Thu-Nguyet Le
(74) *Attorney, Agent, or Firm* — Van Pelt, Yi & James LLP

(57) ABSTRACT

Data collection and transmission is disclosed. A server is configured to receive, from a remote device, a message including raw information, and to parse at least a portion of the received raw information. The raw information is received by the system from an information reporting module interface of the remote device. The information reporting module of the remote device is configured to receive information from at least one separately installed information reporting module. A client device includes an information reporting module interface and a server interface. The client device is configured to receive configuration information from a remote server.

24 Claims, 21 Drawing Sheets

```
{ "name": "CollectorMessage", "type": "record",
  "fields": [
          { "name": "messageId", "type": "long" },
          { "name": "bladeId", "type": "long" },
          { "name": "source", "type": "CollectorSource" },
          { "name": "encoding", "type": "string" },
          { "name": "messageTime", "type": "long" },
          { "name": "payloadSize", "type": "int" },
          { "name": "payload", "type": "bytes" },
          { "name": "count", "type": "int", "default": -1 }
          ]
}, { "name": "CollectorSource", "type": "record",
  "fields": [
          { "name": "name", "type": "string" },
          { "name": "host", "type": "string" },
          { "name": "category", "type": "string" }

SUMO LOGIC – COLLECTOR CONFIGURATION

Activation code: X4DG25   Re-activate this collector

Collector Name: | US West DC1 Servers |   ⌒402

Tags: | West, DB, PII |   ⌒404

Optional Context

Department: | Sales ▽ |   ⌒406

Regulations: | PCI DSS ▽ |   ⌒410

Function: | Customer PII hosting ▽ |   ⌒406

Data center: | US_WEST_DC_1 ▽ |

Description: | Primarily linux servers hosting customer information databases including Oracle and MySQL instances. |   ⌒408

[Submit]

| Sign Out

FIG. 4

SUMO LOGIC – SOURCE CONFIG (ADD SYSLOG SOURCE) | Sign Out

Type: ● UDP ○ TCP ─502

Port: 514 ─504

Name: ─506

Tags (Optional): ─508

Optional Context

Source Type: [Firewall / IDS/IPS / Routers / UNIX/Linux / ...] ─510

Source Vendor: [Cisco / Juniper / Sourcefire / ...] ─512

Version:

Department: HR

Description:

Save

SUMO LOGIC – SOURCE CONFIG (ADD FILE/DIRECTORY SOURCE)  | Sign Out

Path: /var/log/*.log        [File Chooser] — 604
                                     602

Unix or Windows syntax accepted. You may also use the File Chooser. Specify a single path (e.g., /var/log/my.log), directory path (e.g., /var/log/), or partial path (e.g., /var/log/*.log).

Host(s):

List hosts, separated by commas. If omitted, local collector host is assumed.

Name:

Tags (Optional):

Optional Context

Source Type: Firewall / IDS / IPS / Routers / UNIX / Linux / ...

Source Vendor: Cisco / Juniper / Sourcefire / ...

Version:

Department: HR

Description:

[Save]

SUMO LOGIC – COLLECTOR MANAGEMENT (COLLECTOR LIST)    Sign Out

Available Collectors:

| Collector Name | Tags | Description | Status | On/Off | Delete | Clone |
|---|---|---|---|---|---|---|
| △ US West DC1 | West, PII | xxxxxx xxxxx | Running | STOP | 🗑 | 📄📄 |
| ▽ US West DC2 | West, HR, ERP | xxxxxx xxxxx | Stopped | ▲ | 🗑 | 📄📄 |

| Source Name | Tags | Type | Details | Status | Description |
|---|---|---|---|---|---|
| Linux Srv 1 | HR | Remote tail | /var/log/*.log | Running | xXxxxXXxXxxxX |
| Firewall 1 | Perimeter | Syslog | UDP | Running | xXxxxXXxXxxxX |
| VPN | Perimeter | Syslog | TCP | Stopped | xXxxxXXxXxxxX |

} 324

| △ US East DC1 | East, Testing | xxxxxx xxxxx | Running | STOP | 🗑 | |

+ Add New

```
Oct 27 10 57 16 HOST123 60d01h10m52s I STP VLAN 1 Port 16 STP State > LISTENING (MakeFwding)
Oct 27 10 57 16 HOST123 60d01h36m45s I STP VLAN 1 Port 16 STP State > DISABLED (PortDown)
Oct 27 10 57 16 HOST123 59d10h17m40s I STP VLAN 1 Port  6 STP State > DISABLED (PortDown)
Oct 27 10 57 16 HOST123 59d06h32m21s I STP VLAN 1 Port  2 STP State > LEARNING (FwdDlyExpiry)
                                       .
                                       .
                                       .
Oct 27 10 52 33 HOST123 58d05h17m40s I STP VLAN 1 Port  4 STP State > DISABLED (PortDown)
```

1302 — (Port 16 ... Port 4 bracket)
1304 — (State > LISTENING ... DISABLED bracket)
1306 — (Port 4 brace)

FIG. 13A

```
\a+ \d+ \d+ \d+ HOST123 \d\dd\d\dh\d\dm\d\ds I STP VLAN 1 Port \d STP State >
(LISTENING \(MakeFwding\)|DISABLED \(PortDown\)| LEARNING \(FwdDlyExpiry\))
(LISTENING \(MakeFwding\))
```

FIG. 13B

1802 — Jan 16 13:41:05 Brunos-Computer com.acme.backupd[28493]: Attempting to mount network destination using URL: afp://bruno@havingness.local/time_machine 1804 — 16235424 Oehabf-Pbzchgre pbz.npzr.onpxhcq[28493]: Nggrzcgvat gb zbhag argjbex qrfgvangvba hfvat HEY: nsc://oehab@univatarff.ybpny/gvzr_znpuvar 1806 "Attempting to mount" | extract "\s(?<process>.*)\[.*\]\: using URL\: (?<url>.*)" | where process startswith "com.acme." | count by url | sort desc 1808 "Nggrzcgvat gb zbhag" | extract "\s(?<process>.*)\[.*\]\: hfvat HEY\: (?<url>.*)" | where process startswith "pbz.npzr." | count by url | sort desc

FIG. 18

DATA COLLECTION AND TRANSMISSION

CROSS REFERENCE TO OTHER APPLICATIONS

This application is a continuation of co-pending U.S. patent application Ser. No. 13/173,882, entitled DATA COLLECTION AND TRANSMISSION filed Jun. 30, 2011 which is incorporated herein by reference for all purposes.

BACKGROUND OF THE INVENTION

Business and other entities are increasingly interested in capturing data associated with their computer networks for information technology (IT) security, IT operations, compliance, and other reasons. Unfortunately, analyzing that data can be difficult, expensive, and ineffective. One reason is that the data is voluminous and generated at a rapid rate. Existing products for analyzing such data require significant storage and computing power and thus are expensive to purchase. Another reason is that deploying such products typically requires a significant amount of expert contractor time. If new types of data are to be captured and analyzed by the product, significant work is typically required. In some cases, due to the complexity in maintaining such products and the resources required, customers may be unable to rely on in-house support staff to perform product upgrades or to reconfigure the product after changes are made to their networks, but instead will require the re-involvement of contractors.

BRIEF DESCRIPTION OF THE DRAWINGS

Various embodiments of the invention are disclosed in the following detailed description and the accompanying drawings.

FIG. 3 illustrates an example collector message format.

FIG. 4 illustrates an embodiment of a collector configuration interface as rendered in a browser.

FIG. 5 illustrates an embodiment of a source configuration interface as rendered in a browser.

FIG. 6 illustrates an embodiment of a source configuration interface as rendered in a browser.

FIG. 7 illustrates an embodiment of a collector management interface as rendered in a browser.

FIG. 8 illustrates an embodiment of a collector management interface as rendered in a browser.

FIG. 13A illustrates a subset of entries in a log file.

FIG. 13B illustrates an example of a regular expression.

FIG. 18 illustrates examples of log data and queries.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
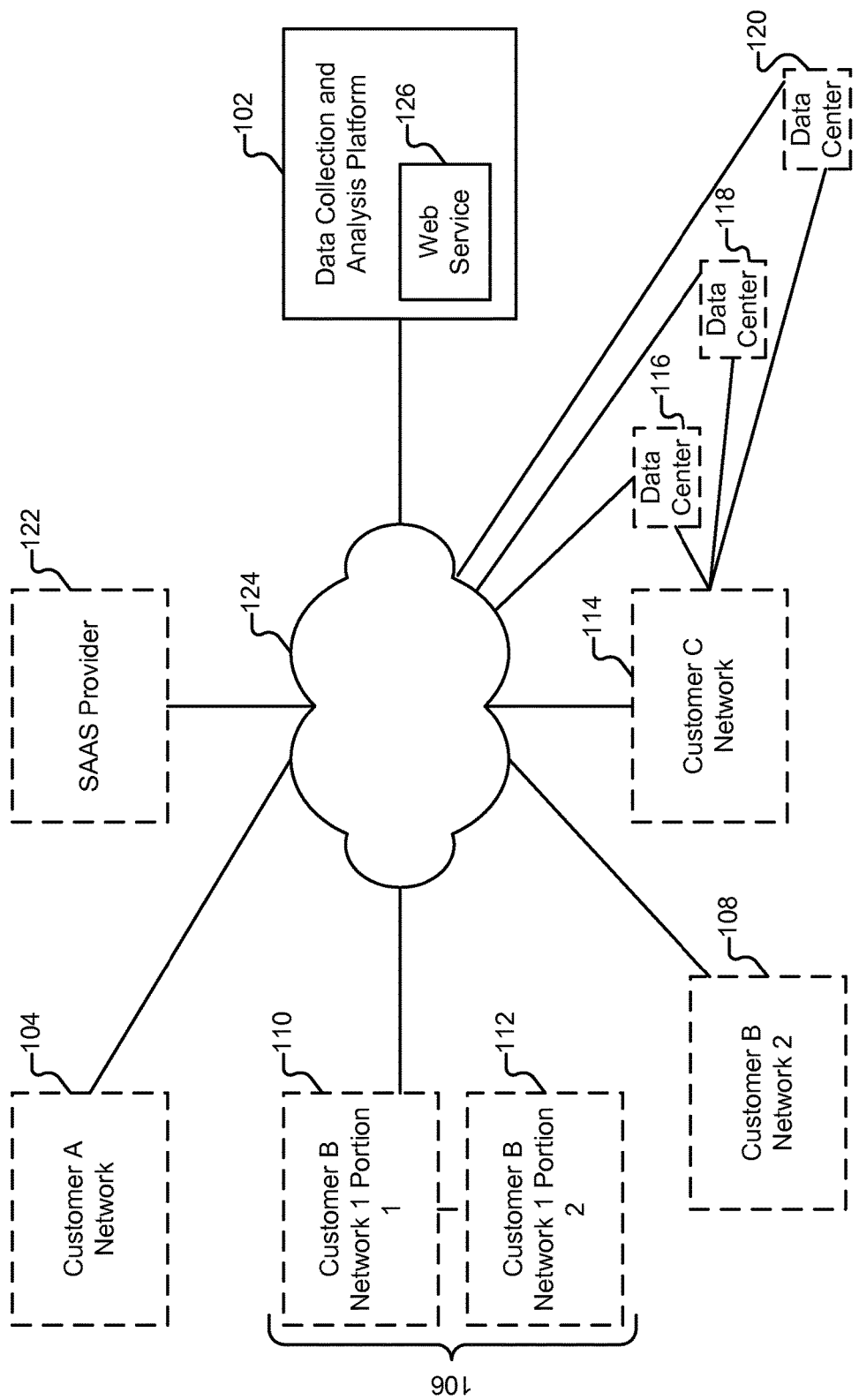
FIG. 1 illustrates an environment in which data, including event data, is collected and analyzed.

FIG. 1 illustrates an environment in which data, including event data, is collected and analyzed. In the example shown, three different customers (Customers A, B, and C) provide data to a data collection and analysis platform 102 (also referred to herein as "platform" 102) via network 124. Other elements may also provide data to platform 102, such as software-as-a-service provider 122 ("SAAS Provider" 122).

Customer A (also referred to herein as "Acme Company") maintains an enterprise network (104) at a single location. Included within the network are various desktop and laptop computers, commodity server-class hardware running various business applications and database software, and other devices typically deployed in an enterprise setting. As will be described in more detail below, data collectors can be installed within network 104 and configured to transmit data, including event data, to platform 102. The collectors are also configured to receive information from platform 102, such as configuration and control messages.

Customer A also makes use of services offered by SAAS Provider 122. SAAS Provider 122 is configured to report information associated with Customer A (and others of its customers) to platform 102. In particular, SAAS Provider 122 can provide both in-application log information, as well as lower level information (such as failed login attempts against Customer A's accounts). Using the techniques described herein, data provided by Customer A, and data provided on behalf of Customer A by SAAS Provider 122 can both be ingested into platform 102 and correlated. Other types of providers can also be integrated into the environment shown in FIG. 1 such as platform-as-a-service (PAAS) and Infrastructure as a Service (IAAS) and the techniques described herein adapted accordingly. SAAS, PAAS, and IAAS providers are referred to collectively herein as "third party service suppliers."

Customer B (also referred to herein as "Beta Corporation") is significantly larger than Customer A and maintains networks in multiple physical locations. For example, Beta Corporation has one office in Singapore and another in Denver, each with respective networks (106, 108). Collectors installed at network 108 are configured to communicate with platform 102. Network 106 is subdivided into two portions—one of which (110) is allowed to communicate with nodes outside network 106, and one of which is not (112). In this scenario, collectors installed within network 112 communicate with collectors installed within network 110 (a process also referred to herein as "collector chaining"), which in turn communicate with platform 102.

Customer C (also referred to herein as "Cool Co.") is similar in size to Customer A. In addition to maintaining an enterprise network 114, Customer C also leases servers that are located at data centers 116-120. Collectors are installed in network 114 and at data centers 116-120 and all of the collectors communicate information with platform 102.

Platform 102 is illustrated as a single logical device in FIG. 1. As will be described in more detail below, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task.

Figure 2:
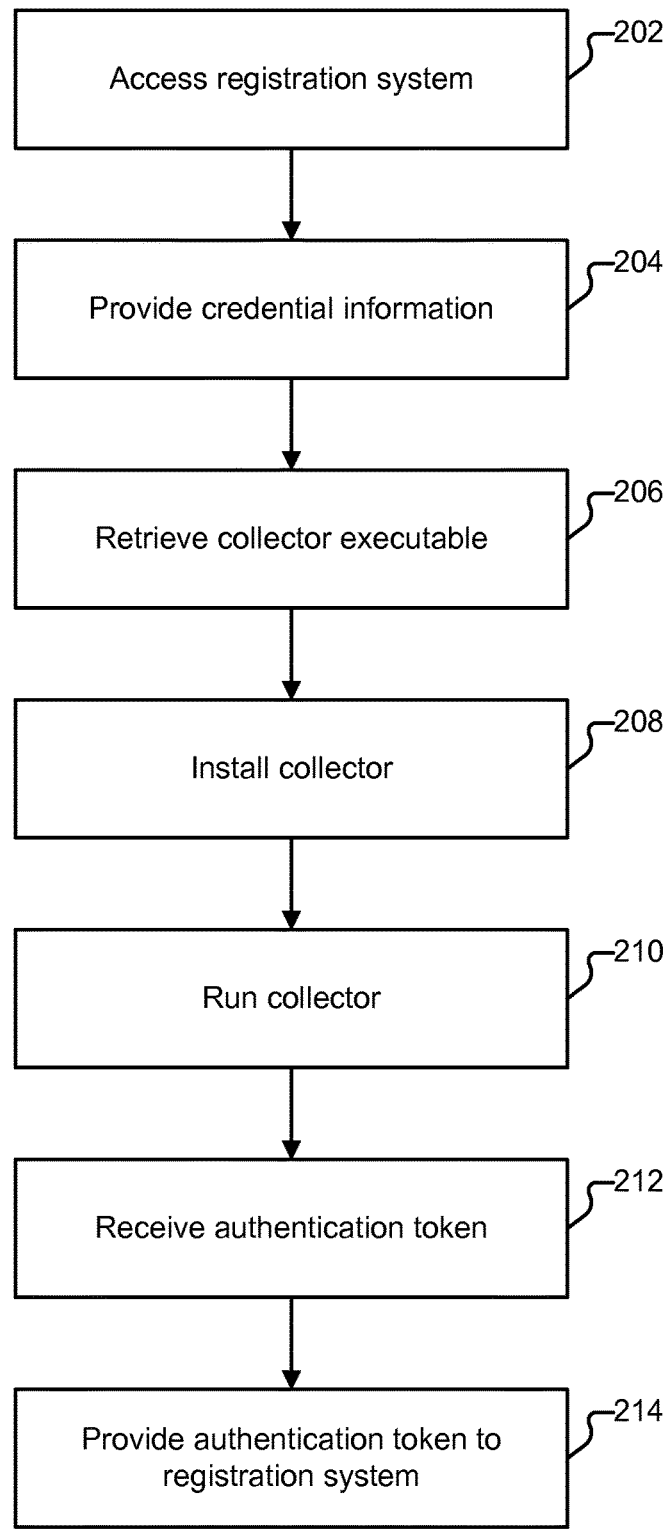
FIG. 2 illustrates an embodiment of a process for enrolling with a data collection and analysis platform.

FIG. 2 illustrates an embodiment of a process for enrolling with a data collection and analysis platform. In some embodiments the process shown in FIG. 2 is performed by an administrator, such as an administrator of network 104 (also referred to herein as "Alice"). The process begins at 202 when Alice accesses a registration system. As one example, at 202, Alice directs a web browser to a web interface provided as a service (126) by platform 102. At 204, Alice provides registration information, such as an email address and password, as well as information about Acme Company. Once Alice's registration information has been approved (e.g., after her email address has been verified), she will be presented with access to a collector executable (e.g., via a download page). Different versions of the collector executable exist for different operating systems. In particular, the application code can be wrapped with operating system specific techniques for installing services. For example, if Alice retrieves an executable (206) for a computer (e.g., her primary administrative console) running a Microsoft Windows operating system, the application will install itself in the Windows Service Manager. In the case of an Ubuntu Linux system, Alice would be instructed to copy an apt get.

At 208, Alice installs the collector. The retrieved collector can be, but need not be used on the computer with which Alice accesses the web interface to platform 102. For example, Alice may desire to install the collector on the Windows-based system but download the collector executable using the Linux-based system, a smartphone or tablet, or other appropriate device. As will be described in more detail below, collectors may be installed on a node to be monitored (e.g., a particular server) and may also be installed on a node that is in communication with a device to be monitored. For example, a collector may be installed on a server that is in communication with a router, printer, and/or other devices onto which a collector is not installed. One collector may collect data for a single device, but may also be configured to collect data from multiple devices, as applicable.

At 210, Alice runs the collector application. On first startup, the executable contacts web service 126 and requests an authentication code (received at 212). The executable instructs Alice to access the web interface using her browser and to enter as input to the collector application the authentication code (214), either via a GUI or via a command line, as applicable. In various embodiments, other credentials are used at portions 212 and 214 of the process. For example, an API key, a username and password, or combinations of credentials can be used as applicable.

As part of a successful registration, various records are created in databases maintained by platform 102. For example, an organization identifier is established for Acme Company and the collector is assigned an identifier that is associated with Acme Company's organization identifier. Other processes can also occur as part of a successful registration. For example, a credential can be generated and pushed to the collector by platform 102.

From an end-user viewpoint, once the authentication code is successfully input, the registration process ends. Alice will now be presented (via web service 126) with an interface to configure her collector, and will typically never directly interact with the collector executable again, nor will she need to manually edit any local configuration files. Instead, she will configure her collector(s) entirely through interfaces provided by web service 126. Any subsequently installed collectors can be configured to report to already installed collectors (e.g., in the chaining scenario described above in conjunction with networks 112 and 110) and can also be configured to report to platform 102 directly.

Collectors have global parameters, such as the amount of bandwidth that the collector can use when exchanging information with platform 102 and what size of cache the collector is allowed to use. If any changes need to be made, Alice is able to view and modify the collector configuration through web service 126. Alice can also define data retention management policies using web service 126. For example, she can specify durations for which data should be stored, whether in raw, or parsed format, and can do so with respect to different types of data. For example, Alice can specify that PCI-related data be stored for one year, while syslog data be stored for one month.

A collector acts as a container, or chassis, for "blades." A blade is a data retrieval mechanism. Each blade knows how to access one particular type of data and may be either passive (e.g., acting as a syslog server and receiving forwarded events) or may be active (e.g., able to log into a router using user supplied or other credentials and pull data). One example type of blade is able to tail a local file. Another type of blade is able to tail a remote file. Yet another type of blade can access a domain server and obtain events. Other blades are configured to access various data sources using vendor APIs. Multiple blades can be instantiated in a single collector, including multiple blades of the same type. For example, if multiple files (e.g., in different directories) are to be "tailed," in some embodiments one blade will be instantiated per file. In some embodiments, if the files to be tailed are located in the same directory, a single blade is used to tail all of those files. Multiple blades can also be configured to access the same file, and a single blade can be configured to access multiple files across multiple directories, as applicable.

Blades are configured to acquire data and provide it to the collector with which they are associated. As will be described in more detail below, the collector packages the information it receives from the blades into messages, which it transmits to a receiver on platform 102.

For some customers (e.g., for highly distributed customers with 2000 sites), the registration process illustrated in FIG. 2 may not be practical. Other techniques can also be used to register users and/or collectors with platform 102. For example, 2000 tokens might be pre-generated by platform 102 and distributed to the customer, along with pre-configured collectors/blades, with instructions for installing the collectors in an automated fashion.

In various embodiments, context data is obtained as part of the registration process and/or is obtained as part of a parallel process. As one example, at 208, when the collector is installed, a separate script executes, prompting the user to answer certain contextual questions about the network, such as what types of devices are present on the network and what their IP addresses are. As another example, the user may be prompted to upload a list of assets to platform 102 using a spreadsheet, a text file, or a dump from a Configuration Management Database (CMDB) system as part of portion 214 of the process shown in FIG. 2. As yet another example, a scanning tool, such as nmap, may be included in an install package (if not already present on the device onto which the collector will be installed). When the collector is run for the first time at 210, the scanner is also run. Based on any of these device discovery techniques (or other appropriate techniques, such as MAC detection), implicated blades can be recommended to the user, can be automatically configured for the collector, or some combination thereof. As one example, if an Apache web server is detected, a blade that tails the /var/log/apache directory of the server can be recommended. The context data can be periodically updated to discover changes to the network, including the addition of new components. For example, on a weekly or other basis, new scans can be performed (and/or any of the other discovery techniques can be repeated) and new blades can be pushed to the appropriate collector (or removed from the collector) as applicable.

As will be described in more detail below, contextual data can also be used to augment message information sent by collectors to platform 102. For example, if a customer has devices such as antivirus, LDAP, or IDM servers, role managers, CMDBs, and/or vulnerability data in their network, data from those sources can be provided to platform 102 as context data (i.e., separately from the messages sent by collectors). In some embodiments, users are asked a series of interactive questions, such as whether they have a CMDB or a network scanner, and based on the answers, solutions are recommended, such as "since you don't have a network scanner, click here to install one." Updates to context data can be sent to platform 102 on any appropriate schedule, such as by performing nightly or weekly refreshes, or by sending updates whenever changes are made.

FIG. 3 illustrates an example collector message format. As will be described in more detail below, multiple messages are packaged together by collectors (into "message piles") and transmitted to platform 102 (e.g., via HTTPS) in a compressed, encrypted form. Various portions of an example message format will now be described. Other message formats (omitting portions of the illustrated message and/or augmenting portions of the illustrated message) can also be used in conjunction with the techniques described herein, as applicable.

In the example shown, the "payload" is the raw data provided to the collector by a blade. One example of a payload is an entry in a firewall log indicating that a computer having a particular source IP address and port attempted to access a particular destination IP address and port at a particular time. Another example of a payload is an entry in a log file indicating that a particular security badge was used to access a particular door at a particular time. Another example of a payload is a credit card transaction that includes a date, amount, and description. Yet another example of a payload is a log from a software application indicating that a particular event took place at a particular time.

The payload for a syslog blade would be one line. For sources where a line terminator does not necessarily map to a semantic end of line (e.g., in the case of Java logs), the message payload may be multiple lines. Different techniques can be used to determine what should constitute the boundaries of a given payload. In the previous two examples (syslog and Java logs), the boundaries conform to a specification. For other formats, regular expressions can be used to determine patterns and suggest to the user (subject to confirmation/override) how to chunk the data into appropriately sized payloads.

The "messageId" is a primary key (assigned when the message is created) and the "bladeId" is the primary identifier of the particular blade that obtained the data. As mentioned above, a given blade reports its information to a given collector (which has its own collector identifier). Thus implicitly a "collectorId" can be associated with a given message without needing to be explicitly included in the message itself.

As illustrated in FIG. 3, "source" is a struct of "source.name," "source.host," and "source.category"—metadata about the source of data that the blade is accessing. In an example where a blade is tailing a particular file, the "name" would be set to the name of the file being tailed. The "host" would be the IP address or hostname of the host from which the data is obtained, and the "category" corresponds to a user-defined category (e.g., "production server" or "testing").

Examples of "encoding" include UTF-8 and ASCII. In some embodiments, the "messageTime" is the time the message was created by the collector. In other embodiments, the "messageTime" is the time at which the data was collected, as that time is reported by the source of the data. For example, if the data is obtained from a device with a clock that is skewed by five minutes, in some embodiments the "messageTime" would be that skewed time instead of the collector's time. In various embodiments, both the time the message was created, and the reported time from the source are stored within the message. As will be described in more detail below, platform 102 can be used to enrich the contents of a message, including by inserting additional timestamp information. The "payloadSize" is the number of bytes to be expected in the aforementioned "payload."

FIG. 4 illustrates an embodiment of a collector configuration interface as rendered in a browser. In the example shown, an administrator at Cool Co. ("Charlie") has registered with platform 102, such as by using the process illustrated in FIG. 2. Charlie has entered the name of his collector in box 402 ("US West DC1 Servers") and provided applicable tags in box 404. In particular, the collector has been tagged with "West" (indicating that the collector is in the West Coast data center), "DB" (indicating that the collector is collecting information from database servers), and "PII," indicating that what is stored in those database includes personally identifiable information. In region 406, Charlie has specified various optional information, such as a description of the data sources (408) and that the data stored on the servers is subject to PCI DSS (410). Such tags can be used to partition data and significantly improve the amount of time it takes to process queries against that data.

FIG. 5 illustrates an embodiment of a source configuration interface as rendered in a browser. In the example shown, Charlie is configuring a particular blade. As with the interface shown in FIG. 4, the interface is provided by platform 102—not by a device sitting in network 114 or data centers 116-120. In the example shown, Charlie is configuring a syslog blade. Default settings for the blade (e.g., that UDP and port 514 will be used) are automatically populated, but can be changed by selecting radio button 502 or dropdown 504. Other applicable information, such as name and tag information are specified in boxes 506 and 508.

In region 510, Charlie can indicate the type of source associated with the syslog, such as by specifying that it is a firewall or that it is a router. If he selects a source type, shared settings (i.e., shared by all firewall sources) can be populated into the blade configuration, such as tag information. Other types of sources (not shown) include Confluence logs and other application logs. Tag information and/or other metadata (whether specified in a collector configuration interface or a blade configuration interface) is, in various embodiments, added to or otherwise associated with messages by platform 102, rather than that information being added by a given collector or blade.

In region 512, Charlie can indicate the vendor of the source. In various embodiments, information such as source vendor and version may be omitted by Charlie during initial configuration, but be subsequently automatically populated (or populated subject to Charlie's approval) once messages are received from that blade (e.g., based on metadata or other indicators of vendor/version). In various embodiments, Charlie is provided with the ability to override system assumptions, such as hostname information. For example, if a server from which data (e.g. log data or other event data) is being collected is a virtual computer provided by Amazon Elastic Compute Cloud (EC2), the default hostname assumed for that server may be unwieldy. Charlie is able to specify a more appropriate hostname as applicable, using an interface such as is shown in FIG. 5.

FIG. 6 illustrates an embodiment of a source configuration interface as rendered in a browser. In the example shown, Charlie is configuring a "tail" blade. As with the interfaces shown in FIGS. 4 and 5, the interface shown in FIG. 6 is provided by platform 102. Instructions for how to configure the blade are provided to Charlie, such as in region 602. In the example shown, Charlie has manually entered a path (/var/log/*.log) to logs that reside on his administrative workstation, a Debian Linux system. In other contexts, Charlie could also have chosen to specify a remote file (or directory) location manually, and could also use the File Chooser button (604) to specify what log file(s) he would like to tail.

The interface shown in FIG. 6 can be used in conjunction with a variety of devices. As one example, some routers support logging via syslog. The router's logs can be sent to platform 102 by having an administrator make sure the logging functionality is enabled in the router, and configuring a blade to receive that log information as a syslog server. In various embodiments, configuring the router is an automated task performed by the collector application. For example, Charlie could be prompted for credential information associated with the router (e.g. the router administration login and password) and the collector application could use that information to configure the correct syslog port and other information on the router. Once configured, the router will provide log information to the blade, which provides the data to a collector which in turn transmits it to platform 102.

Other types of blades can be configured using interfaces similar to those shown in FIGS. 5 and 6, with appropriate modifications. One example is an "active" blade that logs into a particular vendor's router or otherwise communicates with the router (e.g., via an API). The configuration interface for the blade could include a region into which an administrator would enter a login or password (or other credential such as a certificate or token). Other options, such as how frequently to retrieve information from the router would also be specified in the configuration interface. As another example, in the case of a "remote tail" blade, information such as an ssh key, or NFS mount information could be provided in the blade configuration interface. As yet another example, a blade could be configured to periodically access an FTP drop site for data using supplied credentials. In various embodiments, the collector to which the blade provides data is responsible for breaking the file retrieved from the FTP site (or other multi-line data source) into discrete messages.

FIG. 7 illustrates an embodiment of a collector management interface as rendered in a browser. In the example shown, Charlie has configured two additional collectors with platform 102—one at data center 118 (702) and one at data center 120 (704). The collector that Charlie configured using the interface shown in FIG. 4 appears in region 706. Suppose Charlie wishes to modify the configuration of collector 702. To do so, he clicks on link 708 and will be presented with an interface similar to the one shown in FIG. 4. If Charlie clicks on a tag, such as "West," only those collectors having that tag (collectors 706 and 702) will be displayed in interface 700. If Charlie clicks on "Running" link 710, a search for the collector's log files will be launched. Charlie can start and stop a given collector by selecting one of the icons depicted in On/Off column 712. He can delete a collector by selecting one of the icons depicted in column 714. Charlie can create a new collector by either selecting button 718, or by cloning one of the existing collectors by selecting one of the icons depicted in column 716.

FIG. 8 illustrates an embodiment of a collector management interface as rendered in a browser. Charlie selected icon 708 in the interface shown in FIG. 7 and was presented with the interface shown in FIG. 8 as a result. In particular, by selecting icon 708, Charlie has exposed a list of the blades in region 324. As with the collectors, Charlie can modify, delete, and/or add new blades by interacting with the interface shown in FIG. 8 or other appropriate interfaces. Any changes made to collectors or to blades by Charlie (e.g. through the interfaces shown herein) will be transmitted by platform 102 to the implicated collector and take effect immediately.

In various embodiments, the collector is a microkernel and the blades can be plugged in and removed without modifying the microkernel itself. Using the techniques described herein, only those blades required for data collection at a given site need be present. If new blades are subsequently needed (e.g., because a customer has installed new hardware), only those needed blades need be sent by platform 102 to the collector. Similarly, if a given blade ceases to be needed by a collector (e.g., because the last instance of the blade has been removed from the collector's configuration), it can be removed.

Figure 9:
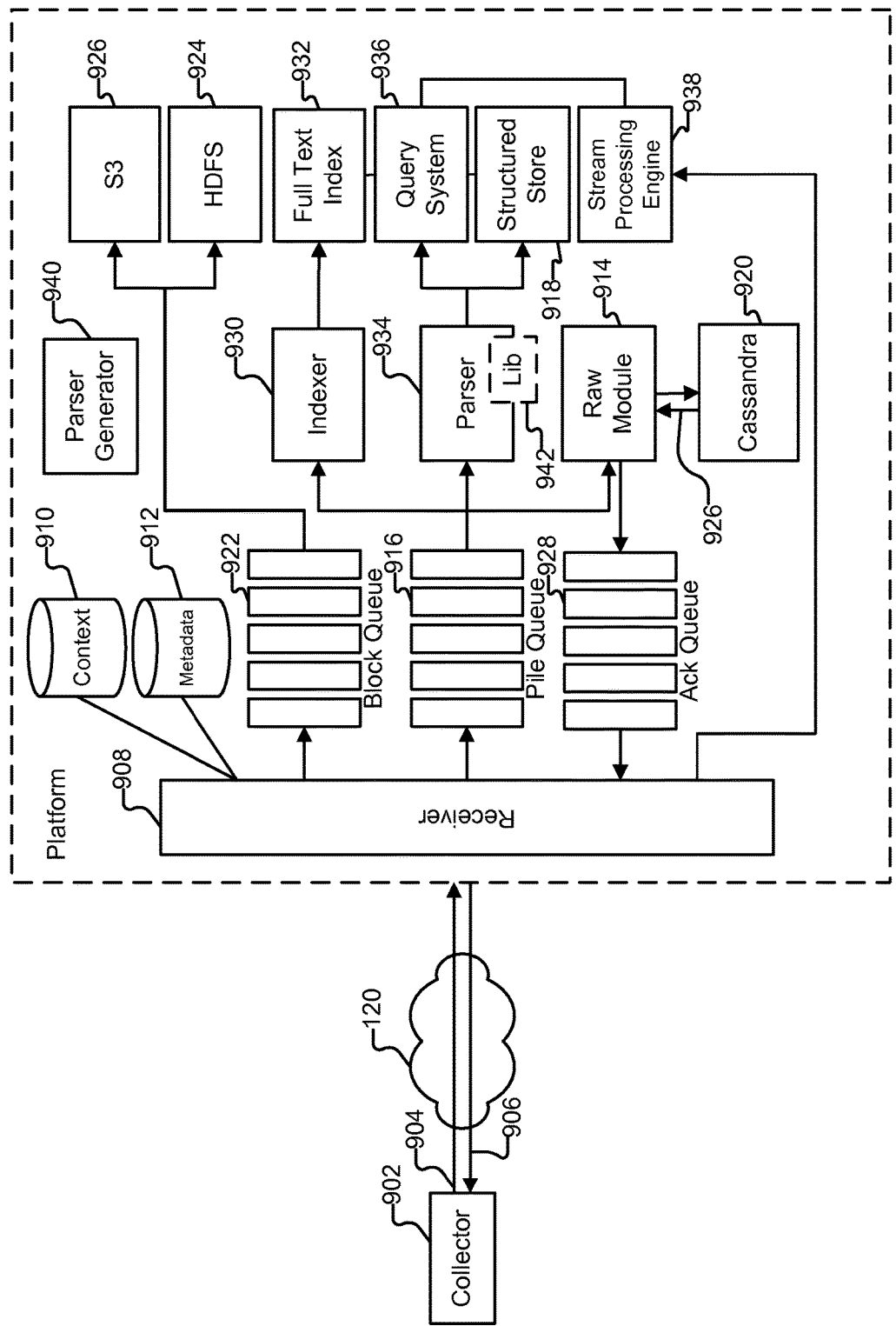
FIG. 9 illustrates an embodiment of a data collection and analysis platform.

FIG. 9 illustrates an embodiment of a data collection and analysis platform. In the example shown, collector 902 communicates with platform 102 via a receiver 908 using bidirectional communications (904/906). In particular, collector 902 sends message piles (e.g., containing 300 messages) to platform 102, optionally sends context data, and receives configuration and command messages from platform 102. In various embodiments, collector 902 also receives information for other devices from platform 102, such as by receiving alerts or remediation information to be provided by the collector to a remediation device or an administrative console.

Collector 902 also periodically sends heartbeats to platform 102. In various embodiments, collector 902 is configured to send a heartbeat to platform 102 each time more than 5 seconds (or another appropriate length of time) have elapsed since the collector last sent a communication (whether another heartbeat, or a message pile, or context data). If platform 102 notices that the heartbeats it receives from collector 902 have become sporadic or stopped entirely, platform 102 is configured to notify one or more appropriate entities. As one example, Alice may configure platform 102 to email her in the case of any detected failures of any collectors associated with Acme Company. Alice may also configure platform 102 to email an alias or group of administrators, and/or to generate alerts via other communication channels, such as sending a text message to her phone.

Database 910 is configured to store received context data in context tables. Other appropriate data structures may also be used, as applicable, depending on the nature of the context data. The context data can be mapped to portions of the data received via the message piles. For example, a given blade (having a particular blade identifier) may be associated with a particular end user workstation. Information about that user may also be received as context data obtained from Active Directory or another appropriate source. As described in more detail below, such context information is an example of data that can be used to augment messages.

Database 912 is configured to store various types of metadata. In the example shown, database 912 is distinct from raw store 920 (a distributed database). In various embodiments, database 912 (and/or database 910) are also stored by raw store 920.

In various embodiments, receiver 908 is configured to support the Avro remote procedure call and binary serialization framework. Accordingly, while collector 902 could transmit individual messages (e.g., in JSON or XML), efficiencies can be achieved by encapsulating multiple messages into a serialized compact binary format.

When a message pile is received from collector 902, receiver 908 extracts the individual messages included in the pile and enriches the messages as applicable. One benefit of enriching a message is that when the message is indexed, the result will be more useful when performing searches (e.g., by allowing the data to be partitioned in more ways). In various embodiments, messages comprise key-value pairs. Messages are enriched through the addition of other keys. The original raw data is not altered. As will be discussed in more detail below, such a message format allows platform 102 to parse and subsequently reparse message information in a versionable manner.

One example of message enrichment is the addition of various identifiers. Individual messages as created by a collector need not include a blade identifier or collector identifier (or organization identifier) at creation time. All of the messages in the pile were created based on information provided from a single blade. Accordingly, instead of including the blade identifier inside every message, the collector may stamp the message pile with the blade identifier. There is no need for the collector to stamp the pile with a collector identifier or organizational identifier because that information can be determined based on information stored in metadata database 912. Accordingly, one type of enrichment that can be performed by receiver 908 is to insert blade/collector/organizational identifiers into messages as applicable. As another example, user-supplied tag information, inferred metadata, and explicit instructions for augmenting specific fields (e.g., simplifying hostname information) can be included in the message by receiver 908.

Another type of enrichment that can be performed by receiver 908 is the addition of timestamps to messages. Suppose, as explained above in conjunction with FIG. 3, the "messageTime" portion of a message indicates the time that a given message was created by a collector. The message payload may include timestamp information that is distinct from the messageTime. For example, a particular log entry may pertain to a device with a misconfigured system clock (e.g., set to the wrong day) or may have been batch processed by a collector such that the amount of time elapsed between when the log entry was originally generated and when it was processed by the collector is different. In such cases, platform 102 can extract the value included within the log entry and enrich the message with another field, such as "sourceTime." If the value included within the log entry is incomplete (e.g. the log entry says "March 21" but omits the year), receiver 908 can ensure that the sourceTime is stored in a canonical form. Another example of a timestamp that can be used to enrich a message is the time that the receiver received the message pile.

Yet another example of enrichment is the creation of a digest of the message (e.g. based on a combination of the message and the associated organization identifier). The digest can be used for audit purposes (e.g., for the detection of tampering) and can also be used in other ways. As one example, platform 102 is a multitenant system. It is possible that data for two different customers will wind up in the same address spaces. Probes can be introduced into the overall call stacks that make explicit the call context: this call is being made on behalf of a particular user at a particular organization. As data is being assessed or produced, the actual message digest along with the organization identifier can be used to re-perform the digest computation as a check with whatever organization identifier is received from the current call context. Checks may be performed for all method calls, but may also be used on a subset of calls, such as for efficiency purposes.

Receiver 908 provides output to various components of platform 102. As one example, it places (enriched) message piles into pile queue 916. One consumer of pile queue 916 is raw module 914, which is responsible for storing message piles to one or more raw data stores. In various embodiments, the raw data store(s), rather than structured store 918 is used as the system of records. In the example shown, the raw data store is the distributed database management system Cassandra, and is used as a near term store. Cassandra has as properties that it is very fast at both reads and writes. Messages are stored in Cassandra (920) for one week. In addition, because it is a distributed system, an acknowledgement of successful write from Cassandra (926) is a good indicator of a durable write. Upon receipt of the acknowledgement, the raw module notifies (via acknowledgement queue 928) the receiver, which in turn sends an acknowledgement back to the collector. As the message piles being stored are relatively small (e.g., 300 messages), latency between when the collector transmits a pile and when it receives an acknowledgement of durable write is minimized. The piles sent by the collector and for which the acknowledgement of durable write are ultimately received include an identifier, generated by the collector. In some embodiments the acknowledgement of durable write sent back to the collector includes the applicable identifier.

Receiver 908 also places message data, repackaged into blocks, into block queue 922. Longer term storage of large files is typically more efficient than longer term storage of smaller files. Accordingly, the blocks are significantly larger than piles, and include the contents of multiple piles inside. The blocks are sent to a Hadoop Distributed File System (HDFS) 924, where they are stored for 30 days, and to Amazon S3 (926) where they are stored indefinitely. When receiver 908 generates a block, a block identifier is created and stored in metadata database 912. Additional information such as what time range it spans, whether it has been sent to S3 yet, and other applicable information is also stored in database 912. The block identifier is also associated with each of the piles whose contents are placed into the block. One way of performing such a linking is as follows: When a pile is first received from a particular organization, a new block is generated in parallel. One of the enrichments made to the pile prior to storage in raw store 920 is the block identifier.

The metadata stored in database 912 is usable to resolve queries more quickly. For example, if a query requesting the raw data for a given customer during a given time range is requested, an intersection of all the time ranges of all possible blocks can be made, thus identifying those blocks that do not need to be opened.

Queue 916 is also consumed by indexer 930 which creates a full text index 932. In some embodiments, indexer 930 receives piles from pile queue 916, examines the data in each message, and prepares the message for full text indexing by extracting tokens and building an inverse index using Lucene.

Parser engine 934 parses messages in the pile queue and stores the results in structured store 918 in accordance with an applicable schema. In various embodiments, parser engine 934 includes a library 942 of parser rules/schemas. If the message has an associated source type (e.g., specifying that the message is from an Apache server, or that it is a credit card transaction), the corresponding rule set will be selected from the library and applied when parsing. If the source type has not been specified, efficient parsing of the message can nonetheless be performed by platform 102. As will be described in more detail below, an appropriate rule set can be automatically selected from the library and used (conceptually, turning parser engine 934 into an Apache parser or credit card transaction parser), by performing a heuristic or other evaluation of the message (or sequence of messages). In some cases, a preexisting parser rule set may not exist for a given message. As will also be described in more detail below, an appropriate rule set can be automatically generated (e.g., by parser generator 940) and ultimately stored in the parser library.

In the example shown in FIG. 9, a single parser engine 934 is depicted. In various embodiments, multiple parsing engines are present within platform 102 and rules are tagged with which parsing engine(s) they pertain to. For example, one parsing engine may be configured to support the parsing of plaintext messages, while another parsing engine may be configured to support the parsing of binary data.

As explained above, structured store 918 need not serve as a system of record. Instead, structured store 918 is used as a performance optimization so that structured analytics do not need to constantly parse and reparse raw data. Indeed, because the raw message information is preserved, at any time (e.g., if improved parsers are developed), the data in the structured store (or portions thereof) can be erased and replaced, or augmented, as desired. For example, as explained above, a first customer might provide to platform 102 a rule set/schema for handling log files from an obscure application. Suppose a second customer of platform 102 (and user of the same application) initially uses the tools supplied by the first customer to store data in the structured store. The second customer subsequently improves those tools. Both customers are able to reparse (or augment, depending on how the rule set/schema have been modified) their data based on the improvements.

Stream processing engine 938 has a direct connection from the receiver and allows users such as Alice and Charlie to obtain real time information about their systems.

Query system 936 supports (e.g. via web service 126) the ability of users such as Alice and Charlie to perform queries against their data. Cross-customer data analysis can also be performed. In some embodiments query system 936 is an SQL query engine and supports batch oriented queries. In various embodiments, query system 936 pulls together data from raw module 914, structured store 918, and stream processing engine 938, and use techniques such as full text indexing to apply those sources against the input data—either individually or in combination.

Figure 10:
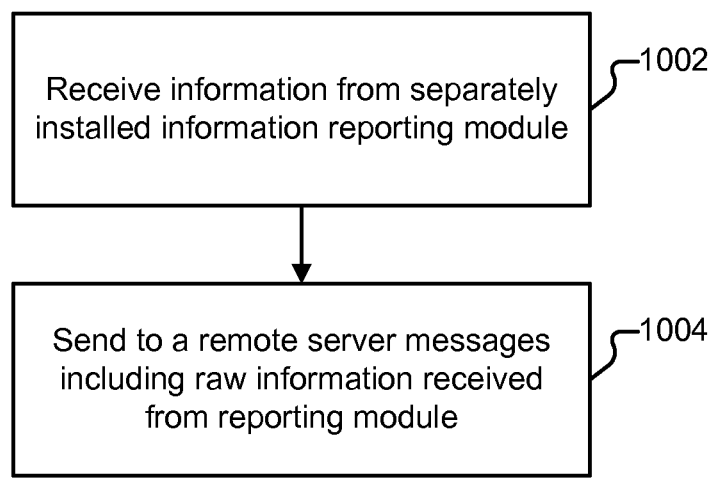
FIG. 10 illustrates an embodiment of a process for collecting and transmitting data.

FIG. 10 illustrates an embodiment of a process for collecting and transmitting data. In some embodiments the process is performed by a collector, such as collector 902. The process begins at 1002 when information from a separately installed information reporting module is received. As one example, at 1002, information from a syslog blade is received by collector 902. At 1004, messages, including the raw information received at 1002, are sent to a remote server. As one example, at 1004, collector 902 transmits a message pile to platform 102.

Figure 11:
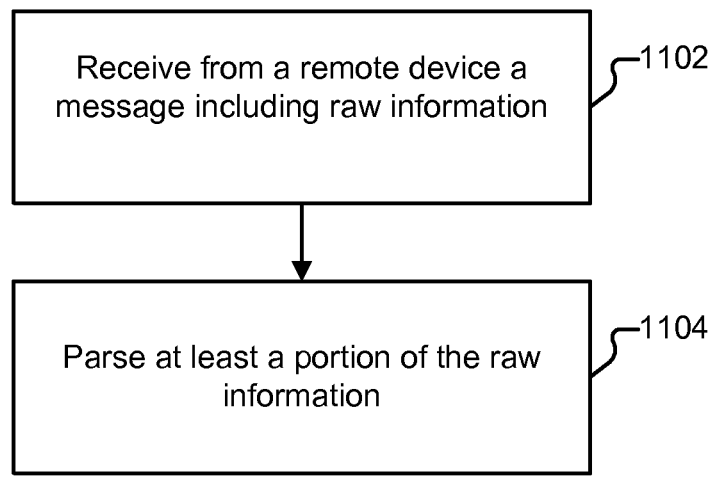
FIG. 11 illustrates an embodiment of a process for receiving and processing data.

FIG. 11 illustrates an embodiment of a process for receiving and processing data. In some embodiments the process is performed by platform 102. The process begins at 1102 when a message is received from a remote device. Included in the message is raw information. One example of raw information is unparsed information. At 1104, at least a portion of the received raw information is parsed.

Automatic Parser Selection and Usage

In various embodiments, customers of platform 102 (and/or vendors) are able to submit parser rule sets/schema to platform 102. The ability to access the submissions may be restricted in use to the submitting customer, but can also be designated for use by other customers. As one example, suppose Acme Company uses a relatively obscure application that provides as output various log files. Alice has configured a blade to supply the log files to platform 102, and the raw data is ingested into platform 102 and stored (e.g. in raw store 920). Initially, no rule sets/schema customized to the application's logs are present in library 942. Even without such tools, the received message data can nonetheless also be included in structured store 918 (if desired). For example, included in library 942 are various token definitions which can be used to recognize pieces of the syntax of the application log. Examples include IP addresses, IPv6 addresses, email addresses, usernames, date formats, and credit card numbers. In some embodiments, when such tokens are used, Alice is presented (e.g. via web service 126) with an interface asking her to confirm the tokenizations proposed by platform 102, and asking her to supply additional information about the application. As one example, Alice would be asked to confirm whether data extracted from a particular field corresponds to a date. Techniques for automatically generating a parser are described in more detail below.

Suppose Alice (either internally within Acme or in cooperation with the application's vendor) develops a full set of parser rules/schema for the application and supplies them to platform 102. Later, when a second customer of platform 102 begins using the same application, Alice's contributions will be available to parse the second customer's data, without the second customer having to expend the effort (and/or money) to develop its own set of tools. The second customer can be made aware of Alice's tools in a variety of ways. As one example, after Alice has supplied rules/schema to platform 102's library, the application can be included in the source type/source vendor options presented in interfaces such as interface 500, allowing the customer to select them. As another example, as with any other blade for which source type information has not been configured, platform 102 can attempt to automatically select an appropriate parser for that data and recommend it to the blade's administrator. A process for performing such automatic selection (whether of common rule sets, such as those for Apache logs, or of more obscure rule sets, such as may have been provided by customers) will now be described.

Figure 12:
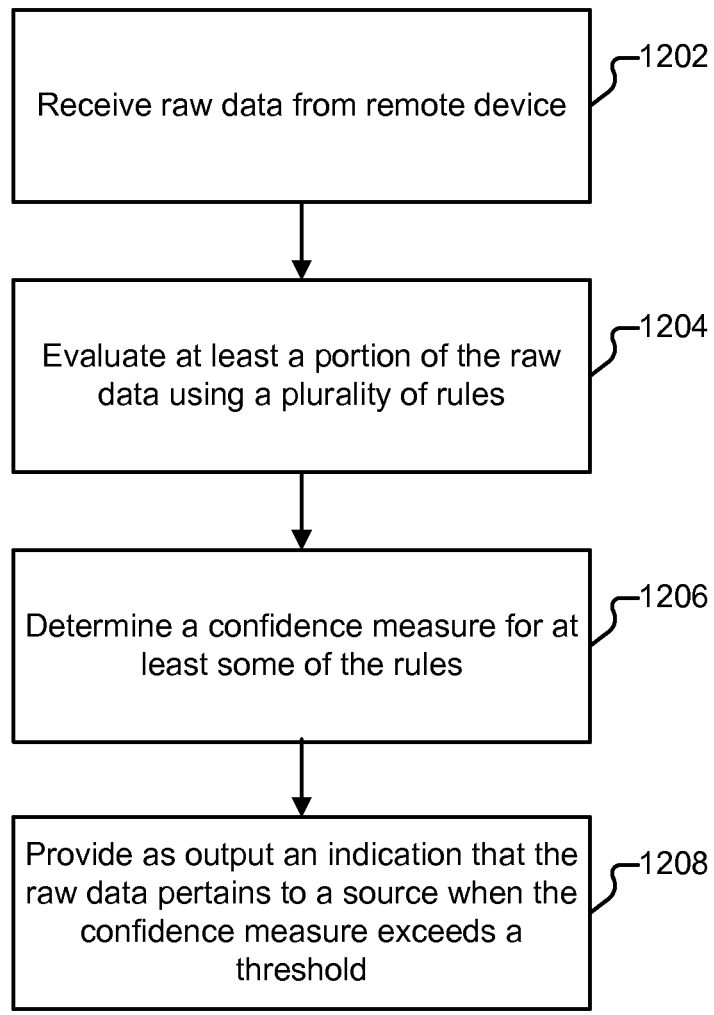
FIG. 12 illustrates an embodiment of a process for automatically selecting a parser.

FIG. 12 illustrates an embodiment of a process for automatically selecting a parser. In some embodiments the process shown in FIG. 12 is performed by platform 102. The process begins at 1202 when raw data is received from a remote source. In some embodiments portion 1202 of the process shown in FIG. 12 corresponds to portion 1102 of the process shown in FIG. 11.

Suppose Charlie has configured a blade using interface 600. Charlie has not specified a source type (or vendor) for the data. At 1204, the raw data is evaluated against a plurality of rules. As one example of the processing performed at 1204, the raw data could be evaluated (e.g., in sequence) against every rule included in library 924 by parser engine 934. As another example, in some embodiments parser engine 934 is implemented as a finite state machine and rules are evaluated in parallel. At 1206, a confidence measure is determined.

As one example of the processing performed at 1204 and 1206, the first 1,000 lines of raw data received from a blade at 1202 are evaluated against each rule in library 924. Suppose the confidence measure for the raw data with respect to an Apache access log parser is 0.999, with respect to a particular vendor's router parser is 0.321, and with respect to a credit card transaction parser is 0.005. A determination is made that the confidence measure with respect to the Apache access log parser exceeds a threshold, indicating that the received raw data is Apache log data (and in particular, access log data), with a very high confidence. As another example, as a result of processing by parser engine 934, a determination of "match" or "not match" could be made. A determination of a "match" corresponds to a high confidence value. At 1208, an indication that the raw data is Apache access log data is output.

The output of the process shown in FIG. 12 can be used in a variety of ways. As one example, the blade that provided the raw data can have its configuration updated to include an appropriate source type (and/or vendor type and version number as applicable). The configuration can be performed automatically and can also be subject to administrator approval. Data received from the blade in the future will be labeled in accordance with the source type and the determined source type can also be retroactively associated with data previously received from the blade, as applicable. For example, metadata database 912 can be updated to include the blade's source information and data already stored in either raw storage or in the structured store can be updated to reflect the newly determined source information. In the case of syslog data (which aggregates log data from multiple applications), the source type could remain set to syslog, however, individual messages of the respective contributors to the log (e.g., ssh) can be labeled.

Suppose a determination has been made, through the process shown in FIG. 12, that a given blade is supplying raw data that corresponds to a source type of an Apache access log. Also suppose that when raw data received from the blade is parsed using Apache access log parser rules, 2% of the raw data is unparseable. This may be an indication that the parser rules are out of date and need to be updated (e.g., because a new version of Apache is creating slightly different log data). In some embodiments, an administrator of platform 102 (or other appropriate entity) is alerted to the discrepancies. The process shown in FIG. 12 can be employed to detect a blade that has the wrong source type set. For example, if Alice has inadvertently designated the source type of a blade as being Apache access log data, when it is in fact data pertaining to a wireless router, platform 102 can determine that the received raw data is largely unparsable (using the Apache parser rules), execute the process shown in FIG. 12 to determine whether a more appropriate source type should have been set, and recommend to Alice that she change the source type (or automatically change it for her).

Another example of how the output generated at 1208 can be used is as follows. When parsing engine 934 parses data from the blade in the future, whether as part of an initial parse as the data is included in structured store 918, as part of a reparsing operation, or in conjunction with other types of parsing, such as may be performed by stream processing engine 938, a particular parser can be automatically selected. The specific parser need not be specified, as parser engine 934 can be configured to always evaluate all messages using all rules. However, by narrowing down the set of rules to be used when parsing, the amount of computing resources required to process the data can be reduced.

The output of the process shown in FIG. 12 can be used to automatically select a schema for which portions of the raw data should be extracted (and how they should be labeled). For example, while a particular raw message may include a total of ten columns' worth of data, the selected schema may state that the first column ("time") and third column ("temperature") should be extracted separately from the other columns, that column two should be discarded, and that columns four through ten should be merged into a single column in the structured store and assigned a collective label.

In some cases, messages may match multiple types of rules with a high confidence. As one example, suppose in an analysis of 10,000 initial lines from a blade, 90% are determined to be Apache access log data, and the remaining 10% are determined to be NTP data. This situation might arise if the device from which the blade is extracting data is an Apache web server that is configured to provide its logs to syslog (as is NTP). In this scenario, the administrator of the blade could be notified of the different types of data appearing in the syslog and be given the opportunity to have those two types of data individually tagged (e.g. with an "Apache" tag and an "ntp" tag). Further, the notice alone would alert the administrator that perhaps the logging on the device itself is misconfigured.

In some cases, none of the confidence measures determined at 1206 will exceed the threshold needed to classify the received message data (e.g., as being Apache access log data). One reason this could happen is that, as explained above, the data may be associated with a new application for which no parser rules/schema exist in library 942. As explained above, approaches such as extracting tokens from the raw data, and applying all parser rules to the data can be used to extract structure from the raw data and store it in structured store 918. In some embodiments, the data is not stored in the structured store (e.g., because storing the data in the raw store is sufficient for the data owner's purposes). Further, in some embodiments, if no appropriate parser is determined for the raw data, the data is assigned a source type of "undefined" (or other appropriate label). Periodically, such data can be reevaluated against the rules in library 942 so that, in the event new or updated parser rules are added that are a good fit for the data, the owner of the data can be alerted and offered the opportunity to begin parsing data using the applicable rules (and/or to reparse the previously received raw data for inclusion in structured store 918). In various embodiments, platform 102 is configured to generate a parser applicable to the raw data.

Automatic Parser Generation

FIG. 13A illustrates a subset of entries in a log file. Suppose the log data shown in FIG. 13A (along with several thousand additional lines) is received (e.g. at 1202 in the process shown in FIG. 12) and, after portions 1204 and 1206 of the process shown in FIG. 12 have been performed, none of the rules in library 942 are determined to be a match (e.g., because all of the confidence measures are low). In some embodiments, one or more parser rules are generated using the raw data according to the following techniques.

Figure 14:
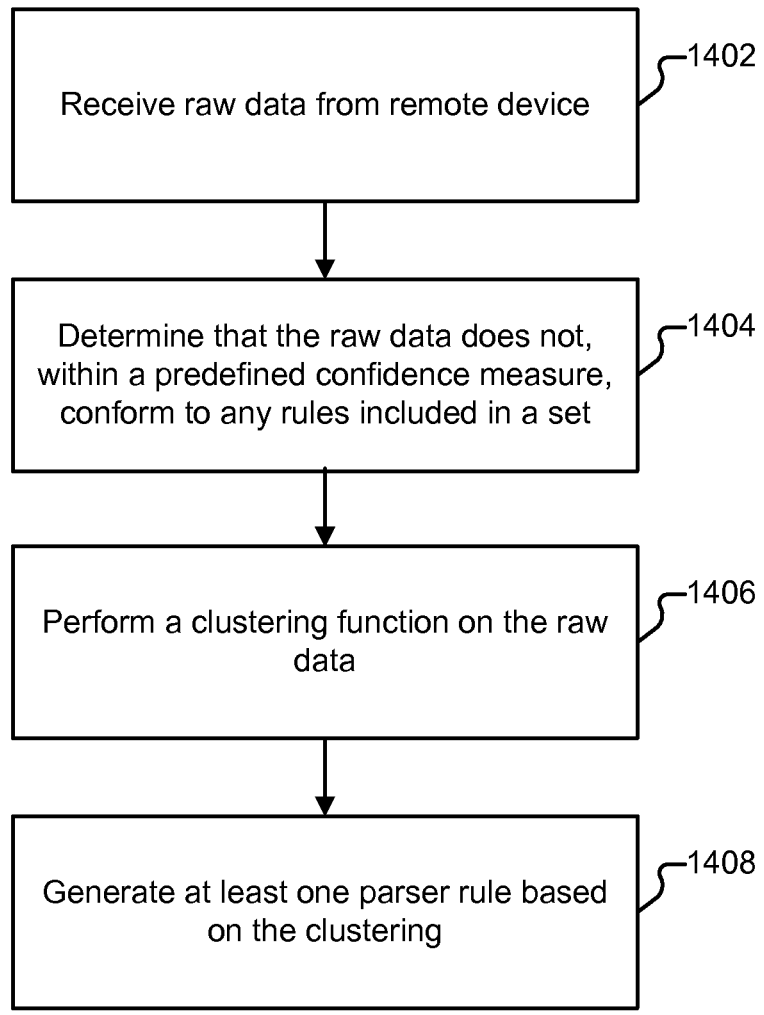
FIG. 14 illustrates an embodiment of a process for automatically generating a parser.

FIG. 14 illustrates an embodiment of a process for automatically generating a parser. In some embodiments, the process shown in FIG. 14 is performed by platform 102. The process begins at 1402 when raw data is received from a remote source. In some embodiments portion 1402 of the process shown in FIG. 14 corresponds to portion 1202 of the process shown in FIG. 12. At 1404, a determination is made that the raw data does not conform to any rules included in a set, such as the rules included in library 942. As one example, at 1404, the confidence measures determined at 1206 are evaluated and a conclusion is reached that none of the measures exceeds a threshold.

At 1406, the raw data is clustered using an appropriate clustering technique. The data shown in FIG. 13A could be clustered into one (or a few) clusters, depending on the clustering technique employed. When thousands of lines are considered, several clusters might emerge. For each cluster, a determination is made of which values in each line are variable across the cluster, and which remain constant, as well as boundary information. As one example, in the data shown in FIG. 13A, "Port" (1302) is present in all five lines, as is "STP State" (1304), while the data in column 1306 changes (e.g., is the value 2, 4, 6, or 16). Other values (e.g., "Oct 27") which appear to be constant based on the lines shown in FIG. 13A would (after evaluating a sufficient number of lines) be determined to change.

Regular expressions that match the analyzed clusters can then be automatically generated and structure inferred, such as the number and size of columns. Using the lines shown in FIG. 13A, a sample regular expression that would match all of the lines is shown in FIG. 13B. The regular expression shown in FIG. 13B is an example of a parser rule (1406). Other rules applicable to other lines of the log (not shown) could also be generated to form a set of parser rules for the blade from which the raw data is received (e.g., at 1402).

As explained above, library 942 includes various token definitions for entries such as IP addresses and email addresses. In some embodiments, in addition to generating a set of parser rules for the data received at 1402, labels for at least some of the columns are automatically selected (e.g., using the token definitions). Using the example shown in FIG. 13A, tokenization could be used to identify the first portion of each line as being a date, and a time, respectively, or an absolute time, collectively.

In various embodiments, the parser rule(s) generated at 1408 (and any associated column labels) are presented to a human for review. The human may be an agent/employee of platform 102, but may also be an administrator of the blade from which the raw data used to form the rules/labels was received (i.e., at 1402). Errors may be present in the automatically generated rule(s), and the column labels may be incorrect or incomplete. As one example, the regular expression shown in FIG. 13B indicates that "Host123" is static information. An administrator of the blade might recognize that "Host123" is a "hostname" (thus supplying a label that was not able to be determined by platform 102) and also indicate that instead of being represented in the rule as "Host123" it should instead be represented as "\a+," so that the rule can be generalized for use with other hosts (including hosts of other customers).

The rules/labels can be confirmed, or modified as applicable, and then saved for future use, such as by being included in library 942. The administrator of the blade can also be asked to provide additional contextual information. As one example, a dialog can be presented to the administrator that says, "We've detected that you're sending us data from a new kind of log. Please help us improve our tools by identifying the source of the data." Information provided by the administrator can be used to associate a source type (and/or source vendor and version) with the generated parser rule(s)/labels.

As explained above, customers can leverage tools provided to library 942 by other customers. Thus, if a second customer has a blade that transmits message data that is sufficiently similar to the data shown in FIG. 13A, the generated parser(s)/labels can be automatically selected for use by platform 102 and/or can be recommended to the second customer. A source type for the second customer's blade can similarly be recommended based on information provided by the first customer. The second customer can also be presented with the selected rule(s) and labels and given the opportunity to modify them as necessary. For example, the second customer may notice that the rule does not cover all of the applicable states (e.g., listening, disabled, learning).

Selective Structure Preserving Obfuscation

For at least some customers of platform 102, some of the message data transmitted by the customer to platform 102 may be sensitive in nature. Examples include internal IP addresses/hostnames, email addresses, and credit card information (collectively referred to as "persistent threat data"). Other information such as external IP addresses, error messages, and timestamp information may be less sensitive, or not sensitive. Further, by leaving certain information, such as external IP address information un-obfuscated, analysis can be performed across multiple customer's data (if applicable), such as to detect certain security trends.

Which particular kind of data is, or is not deemed to be sensitive may depend on the individual customer, and may also depend on which particular blade the data is obtained from. Techniques such as encrypting message data (e.g., via SSL) can be used to protect the data while in transit. Encryption and access controls can also be used to protect the data as it is stored by platform 102. As will be described in more detail below, in various embodiments, at least some of the data transmitted to platform 102 is further protected by being obfuscated (also referred to herein as being transformed) prior to transmission.

Figure 15:
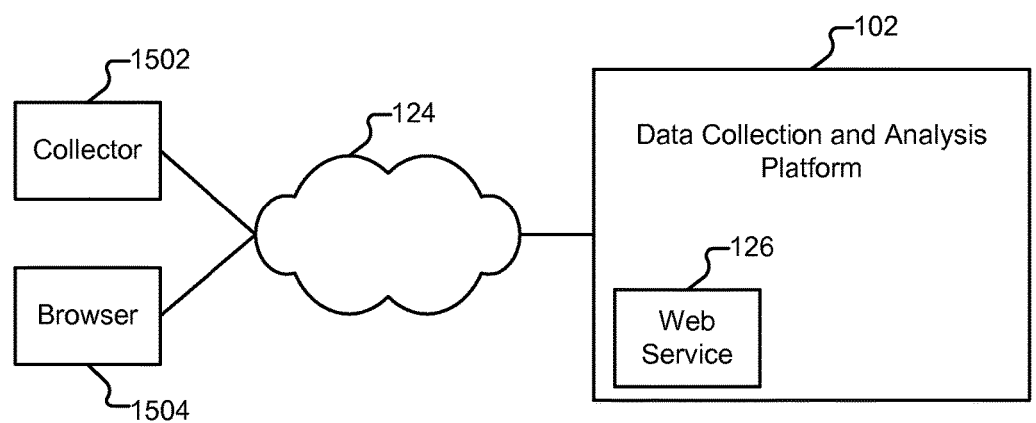
FIG. 15 illustrates an environment in which data, including event data, is collected and analyzed.

FIG. 15 illustrates an environment in which data, including event data, is collected and analyzed. In the example shown, a collector, such as collector 1502 transmits data to platform 102. Suppose collector 1502 is located within Acme Company's network 104. At least some of the data collected by the blades in communication with collector 1502 is sensitive in nature. As one example, message data provided by one blade may include internal IP addresses of mission critical infrastructure. As another example, message data provided by another blade may include email addresses. Other information included in the messages is not considered to be sensitive, such as date and time information.

In various embodiments, Alice is able to configure collector 1502 to obfuscate the internal IP addresses and email addresses in the messages prior to transmission by the collector to platform 102. As one example, as part of her initial configuration of a collector (and/or blade), Alice is presented with a list of common kinds of data that can be obfuscated, and selects which data she would like obfuscated through a checkbox. In that scenario, the collector is configured to automatically detect in message data (such as by using regular expressions) the presence of such kinds of data and automatically obfuscate that data prior to transmission. As another example, Alice can also designate specific regions within a message (e.g., "column 2") that should be obfuscated. As yet another example, company-wide rules can also be specified. For example, a configuration rule can specify that, for any collector collecting information from a system that hosts data that is subject to PCI DSS (e.g., as indicated in box 410), credit card numbers will be replaced with a series of Xs prior to transmission. Another rule can specify that all email addresses transmitted to platform 102 must be obfuscated, irrespective of which blade/collector is responsible for the collection of those email addresses.

As will be described in more detail below, a variety of techniques can be used to obfuscate the data, as applicable. Also, as will be described in more detail below, because the obfuscation is structure preserving, Alice will be able to run meaningful queries against the data (e.g., using browser 1504 and query system 936).

Figure 16A:
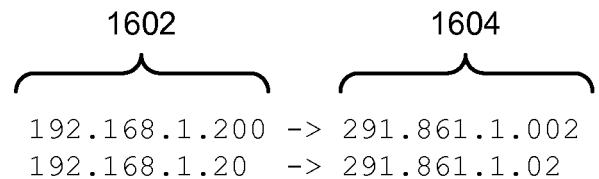
FIG. 16A illustrates an example of an obfuscation of data.

FIG. 16A illustrates an example of an obfuscation of data. In the example shown, internal IP addresses (1602) are obfuscated (1604) by separately operating on each of the four decimal segments of the IP address. In the example shown in FIG. 16A, the obfuscation operation reverses the digits as they appear in the segment. Thus, "192" becomes "291" and "168" becomes "861." More sophisticated obfuscation techniques can also be used. As one example, different offsets may be used for each segment (e.g., the first segment is offset by a value of 50, the second segment is offset by a value of 33, and so on). As another example, the first two IP address segments may be transformed together, while the remaining two IP address segments are transformed individually. As illustrated in FIG. 13, the same value in the same subnet will be transformed the same way across multiple lines (and messages). For example, for both lines appearing in 1602, "192" is transformed into "291." This will allow the obfuscated IP addresses to remain useful for queries (and other analysis) because structure is preserved. Hostnames and URLs can similarly be transformed, with characters such as "/" and "." serving as delimiters.

Figure 16B:
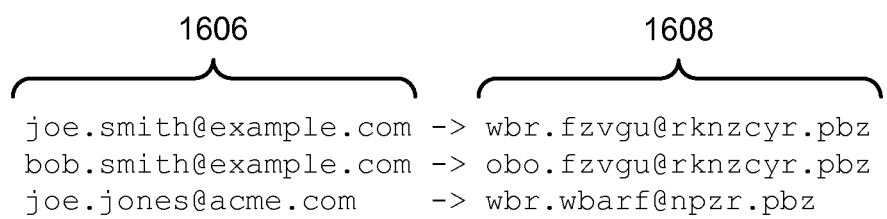
FIG. 16B illustrates an example of an obfuscation of data.

FIG. 16B illustrates an example of an obfuscation of data. In the example shown, email addresses (1606) are obfuscated (1608) by applying the rot13 substitution cipher. Thus, "joe" becomes "wbr." As with the example shown in FIG. 16A, the same value in a given segment will be transformed in the same way across multiple lines and messages, thus preserving structure. For both "joe.smith" and "joe.jones," the "joe" portion becomes "wbr." Similarly, for both "joe.smith" and "bob.smith," the "smith" portion becomes "fzvgu." Finally, the domain portion for employees of Acme will be transformed the same way, with "acme.com" becoming "npzr.pbz." More sophisticated techniques can also be used to obfuscate email addresses. For example, the portion of the email address appearing before the "@" sign can be transformed using a first cipher, while the portion of the email address appearing after the "@" sign can be transformed using a different cipher.

The manner in which the data is obfuscated (be it an IP address, email address, or other data) is known to the collector, and is reversible by browser 1504, irrespective of whether browser 1504 is collocated on the same device as collector 1502. In the examples shown in FIGS. 16A and 16B, this property is achieved because the obfuscation algorithm is either hardcoded to work the same way for all collectors (e.g., always reverse the order of digits in an IP address segment) or is a modification thereof (e.g., add 50 to the first segment and add 33 to the second segment). Another approach is for the collector to obfuscate data in accordance with an obfuscation map. The map can include instructions such as would be usable to transform the data illustrated in FIGS. 16A and 16B and could also be used to perform other transformations, such as by including a dictionary explicitly stating that "acme" should be rewritten as "apple," that "192.168" should be rewritten as "593.459," or that "10.10" (e.g. in an IP address of 10.10.1.1) should be rewritten as "x.12." As yet another example, in a log file which includes first names in column two and last names in column three, and non-sensitive data elsewhere, the map could indicate that the first names are to be transformed in one manner and the last names are to be transformed in a second manner, such as by mapping particular letters to numbers and mapping other letters to different letters. As with the example shown in FIG. 16B, individuals named "Joe" would all have their first names rewritten as "5E7" and individuals named "Smith" would have their last names rewritten as "UA2NT." Instructions for padding the data can also be included in the map, and multiple maps can also be used, such as one map per kind of data/token type.

In some cases, such as where credit card numbers are replaced by Xs, the browser will not be able to recover the message data as it was originally received by the collector from a blade. Nonetheless, other portions of the message (such as a hostname or IP address) which may also have been obfuscated, can be de-obfuscated by the browser in accordance with the techniques described herein.

Figure 17:
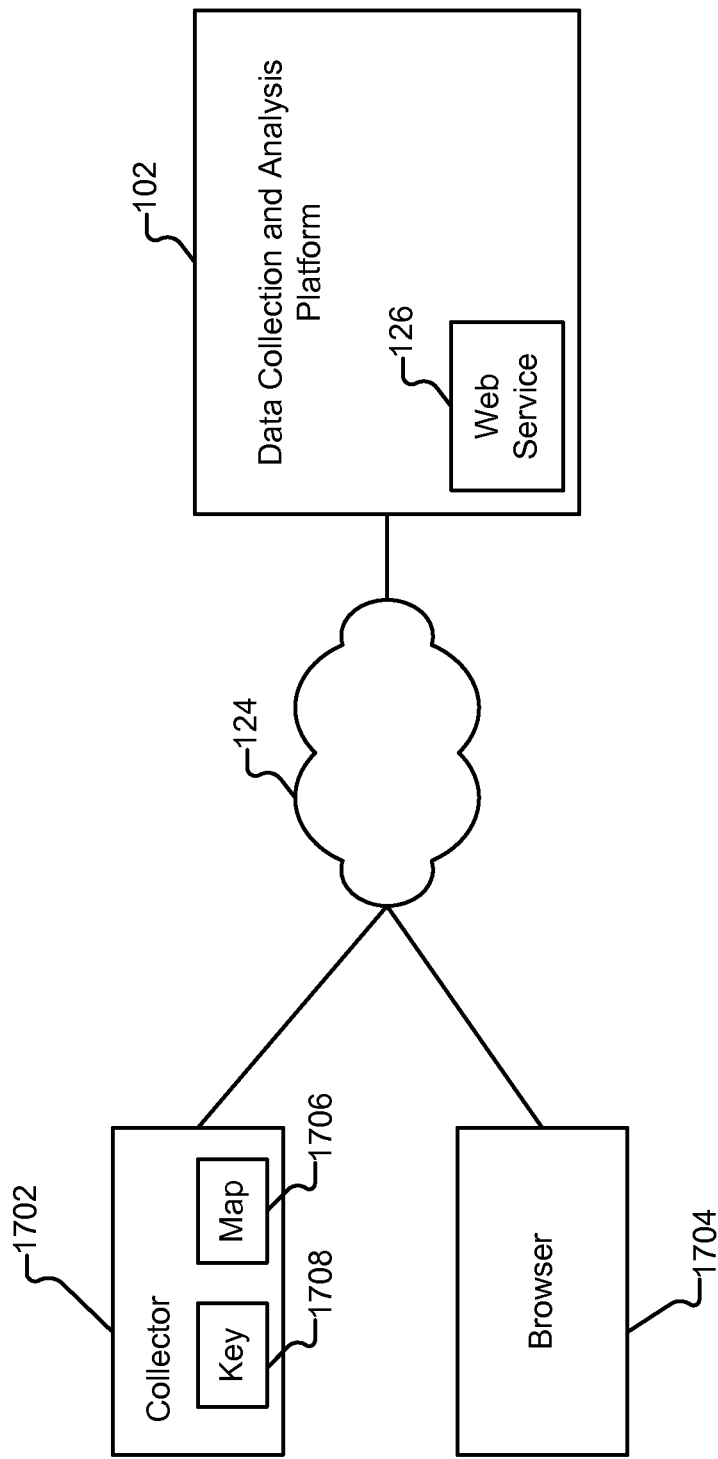
FIG. 17 illustrates an environment in which data, including event data, is collected and analyzed.

FIG. 17 illustrates an environment in which data, including event data, is collected and analyzed. In the example shown, when collector 1702 is initially configured, Alice selects a key 1708 and constructs a map 1706 that indicates how data should be obfuscated. The key and/or map may be created through an interactive wizard interface (e.g., supplied by web service 126) and can also be manually provided to the collector (e.g., by Alice editing a local file). The map is encrypted using key 1708. The map, but not the key, is transmitted to platform 102 where it is stored. When Alice later attempts to run a query that would implicate message data provided by collector 1702, results and the stored map are transmitted to browser 1704. Alice enters key 1708 into browser 1704, which decrypts the map and uses the instructions included therein to de-obfuscate any obfuscated data included in the results provided by platform 102. In various embodiments the key is a string that can be manually typed by Alice. In other embodiments, the key is a file that Alice stores on a USB device and inserts into the computer on which browser 1704 is installed. In either case the browser leverages client side JavaScript code and the provided key to decrypt the map and de-obfuscate the data in accordance with the map.

FIG. 18 illustrates examples of log data and queries. In the example shown, log entry 1802 is obtained by a blade and provided to a collector, such as collector 1702. The collector is configured to obfuscate portions of the data. Specifically, the collector recognizes particular tokens in the data, such as a data date and time, which it converts into a serial number. One approach for such a conversion is to substitute UNIX time and add an offset specified in a map. The remainder of the data is converted using the rot13 substitution cipher. The collector transmits the contents of line 1804 as a message to platform 102 (e.g., as part of a message pile). Suppose at a later time, an administrator of collector 1702 wishes to perform a query to identify instances of where an attempt to mount a device (within the acme.com domain) has occurred. An example of such a query is illustrated in line 1806. Prior to transmission to platform 102 (and query system 936), the administrator is prompted to provide key 1708 (e.g., as part of logging into web service 126). Portions of the query are transformed in accordance with map 1706. The transformed query is illustrated in line 1808. Query system 936 is able to perform a query using the obfuscated data and locate results as appropriate. When results are received by the browser, the browser de-obfuscates the results using the key and map as explained above.

Figure 19:
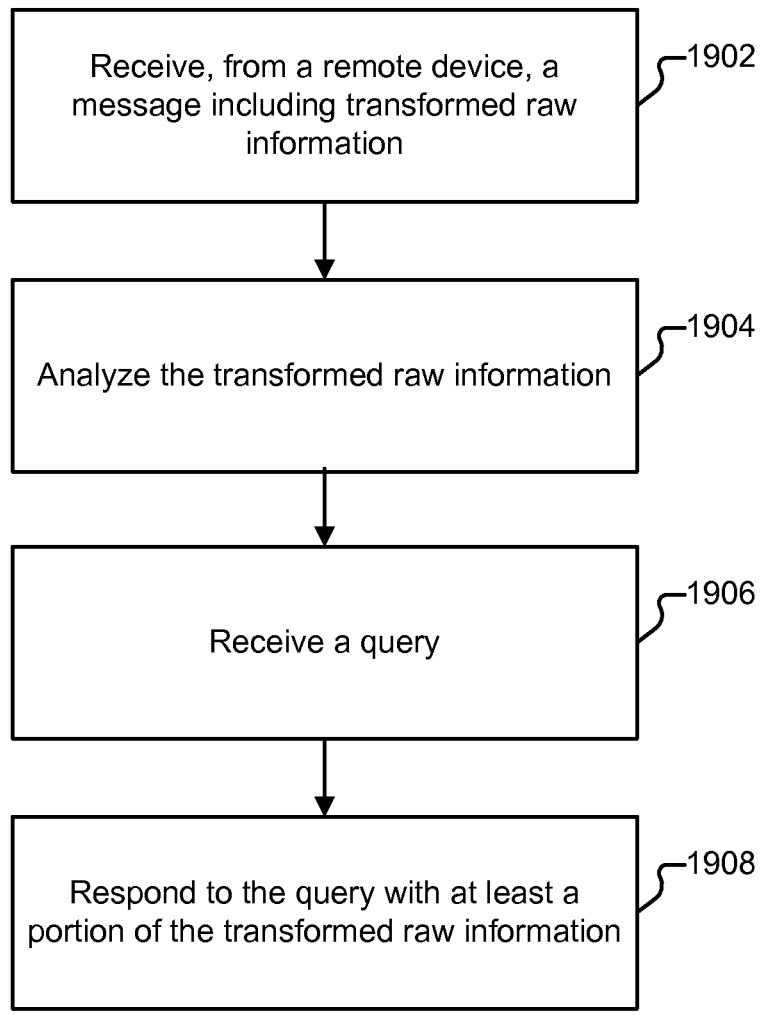
FIG. 19 illustrates an embodiment of a process for receiving data and responding to queries.

FIG. 19 illustrates an embodiment of a process for receiving data and responding to queries. In various embodiments, the process shown in FIG. 19 is performed by platform 102. The process begins at 1902 when a message including transformed raw information is received from a remote device. As one example, at 1902, line 1804 is received by platform 102 from collector 1702. At 1904, the transformed raw information is analyzed. As one example, at 1904, portion 1810 is labeled as a hostname (e.g., as line 1804 is stored in structured store 918). At 1906, a query is received. As one example, query 1808 is received from browser 1704 at 1906. At 1908, the query is responded to using at least a portion of the transformed raw information. As one example, at 1908, at least a portion of 1804 is transmitted by platform 102 to browser 1704.

Figure 20:
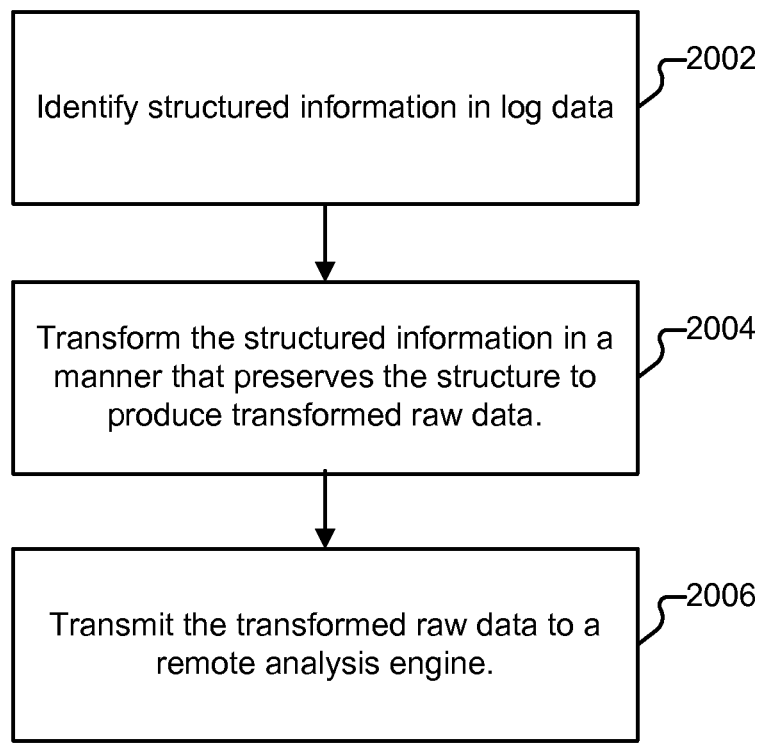
FIG. 20 illustrates an embodiment of a process for transmitting data.

FIG. 20 illustrates an embodiment of a process for transmitting data. In various embodiments, the process shown in FIG. 20 is performed by collector 1702. The process begins at 2002 when structured information is identified in log data. As one example, at 2002, collector 1702 recognizes the presence of an internal IP address in a message. At 2004, the structured information is transformed in a manner that preserves the structure. As one example, at 2004, collector 1702 transforms "192.168.1.200" to "291.861.1.002." At 2006, the transformed data is transmitted to a remote analysis engine. As one example, at 2006, a message including the IP address "291.861.1.002" is sent by collector 1702 to platform 102.

Figure 21:
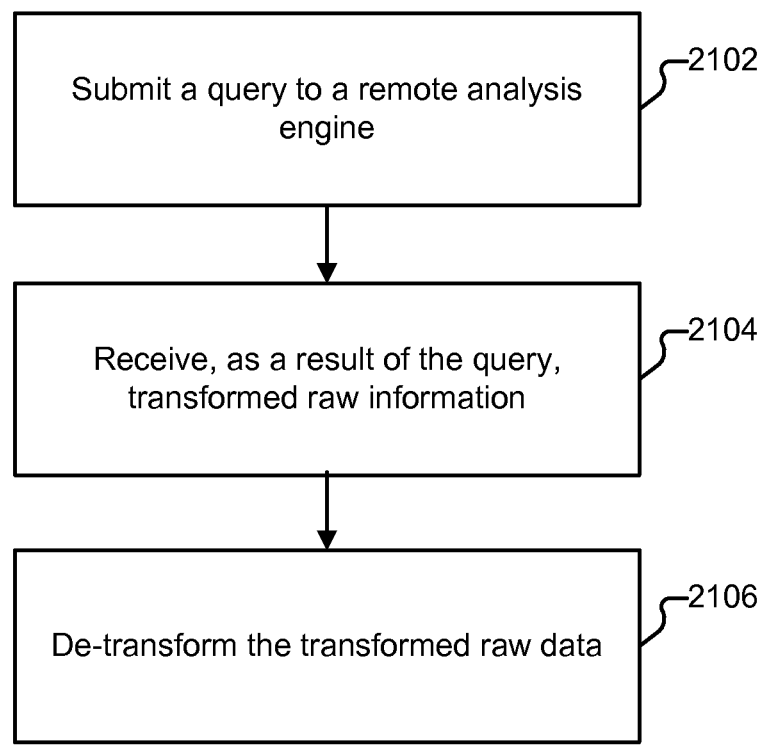
FIG. 21 illustrates an embodiment of a process for transmitting and receiving a response to a query.

FIG. 21 illustrates an embodiment of a process for transmitting and receiving a response to a query. In some embodiments, the process shown in FIG. 21 is performed by browser 1704. The process begins at 2102 when a query (e.g., received from a user) is submitted to 2102. In various embodiments, portions of the query are transformed prior to the submission of the query. As one example, query 1806 as received by a user is transformed into query 1808, which is in turn transmitted at 2102. At 2104, results including transformed data are received. As one example, a result including the transformed IP address "291.861.1.002" is received at 2104. At 2106, the transformed data is de-transformed. As one example, at 2106, browser 1704 transforms IP address 291.861.1.002 back into 192.168.1.200, prior to displaying the results to the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      receive, from a collector installed on a remote device, one or more messages including raw information, wherein the raw information is provided to the collector by a set of blades associated with the collector, wherein each blade in the set of blades is configured to access a particular type of data, wherein the set of blades is installed separately from the collector, and wherein the set of blades associated with the collector is modifiable without modifying the collector;
      wherein the collector is configured to package the raw information provided by the set of blades into the one or more messages;
      wherein the collector is configured to receive information usable to modify the collector or the set of blades that is associated with the collector;
      parse, at the system, at least a portion of the raw information included in the one or more messages received from the collector installed on the remote device; and
   a memory coupled to the one or more processors and configured to provide the one or more processors with instructions.

2. The system of claim 1 wherein the one or more processors is further configured to store at least a portion of the raw information.

3. The system of claim 2 wherein the one or more processors is configured to store the raw information in a short term storage and in a long term storage.

4. The system of claim 2 wherein the one or more processors is further configured to transmit an acknowledgement of durable writing to the collector.

5. The system of claim 1 wherein the system is configured to store parsed information obtained as a result of the parsing of the received raw information separately from the received raw information.

6. The system of claim 5 wherein the stored parsed information is not used as a system of record and wherein stored raw information is used as a system of record.

7. The system of claim 1 wherein the one or more processors is further configured to receive heartbeat information from the remote device.

8. The system of claim 1 wherein the one or more processors is further configured to receive heartbeat information from the collector.

9. The system of claim 1 wherein the one or messages includes an identifier of a blade in the set of blades.

10. The system of claim 1 wherein the one or more processors is further configured to enrich a message in the received one or more messages at least in part by adding a time stamp, creating a digest, or adding meta data.

11. The system of claim 10 wherein the enriched message includes a plurality of timestamps.

12. The system of claim 1 wherein the one or more processors is further configured to push an update to the remote device.

13. The system of claim 1 wherein the one or more processors is further configured to push an update to a blade in the set of blades.

14. The system of claim 1 wherein which blades are installed on the remote device is configurable by the one or more processors.

15. The system of claim 1 wherein the system is configured to cause an additional blade to be installed by sending a communication to the collector installed on the remote device.

16. The system of claim 1 wherein the parsing of raw data is performed asynchronously with the collection of that data by the set of blades.

17. The system of claim 1 wherein a receiver of the received one or more messages is configured to provide the one or more messages to a plurality of queues.

18. The system of claim 1 wherein the one or more processors is further configured to receive, from at least one third party service supplier, information associated with the owner of the remote device.

19. The system of claim 18 wherein the one or more processors is further configured to evaluate information received from the supplier with information received from the owner to determine whether a threat is indicated.

20. The system of claim 1 wherein the one or more processors is further configured to receive, from at least one third party service supplier, information associated with an owner of an account.

21. The system of claim 1 wherein the collector is configurable via a third party website.

22. The system of claim 1 wherein the information usable to modify the collector or the set of blades that is associated with the collector is obtained via one or more user interfaces provided by the system.

23. A method, comprising:
receiving, at a server, one or more messages from a collector installed on a remote device including raw information, wherein the raw information is provided to the collector by a set of blades associated with the collector, wherein each blade in the set of blades is configured to access a particular type of data, wherein the set of blades is installed separately from the collector, and wherein the set of blades associated with the collector is modifiable without modifying the collector;
wherein the collector is configured to package the raw information provided by the set of blades into the one or more messages; and
wherein the collector is configured to receive information usable to modify the collector or the set of blades that is associated with the collector;
parsing, at the server and using a set of one or more processors, at least a portion of the raw information included in the one or more messages received from the collector installed on the remote device.

24. A system, comprising:
a collector installed on a device, wherein the collector is configured to receive raw information from a set of blades that is associated with the collector, wherein each blade in the set of blades is configured to access a particular type of data, wherein the set of blades is installed separately from the collector, and wherein the set of blades associated with the collector is modifiable without modifying the collector; and
wherein the collector is configured to, using one or more processors, package the raw information provided by the set of blades into one or more messages and provide the one or more messages including the raw information to a remote server;
wherein the remote server is configured to parse at least a portion of the raw information included in the one or more messages; and
wherein the collector is configured to receive information usable to modify the collector or the set of blades that is associated with the collector.

* * * * *